United States Patent [19]

Swannell

[11] 4,383,818
[45] May 17, 1983

[54] MOLDING PROCESS

[75] Inventor: Leslie E. J. Swannell, Antrim, Northern Ireland

[73] Assignee: Delorean Research Limited Partnership, Bloomfield Hills, Mich.

[21] Appl. No.: 221,796

[22] Filed: Dec. 31, 1980

[51] Int. Cl.³ .............................................. B29F 1/00
[52] U.S. Cl. .................................. 425/546; 198/472
[58] Field of Search ...................... 425/546; 264/297; 198/472

[56] References Cited

U.S. PATENT DOCUMENTS

| 2,513,785 | 7/1950 | Browne | 18/55 |
| 2,524,419 | 10/1950 | Billner | 25/1 |
| 2,771,619 | 11/1956 | Stewart | 12/1 |
| 2,832,995 | 5/1958 | McCaw | 18/34 |
| 3,055,058 | 9/1962 | Van Hartesveldt | 18/55 |
| 4,038,014 | 7/1977 | Dusza et al. | 425/388 |
| 4,120,632 | 10/1978 | Stoeberl | 425/405 R |
| 4,179,093 | 12/1979 | Western | 249/65 |

FOREIGN PATENT DOCUMENTS 1432333 of 0000 United Kingdom .

Primary Examiner—Thomas P. Pavelko
Attorney, Agent, or Firm—Kenyon & Kenyon

[57] ABSTRACT

In a method of molding a large plastic structure which includes applying a vacuum to draw the molds together, injecting resin into the space between the molds while the vacuum is applied, maintaining the vacuum at least until the resin gels, removing the vacuum, allowing the molded structure to harden, removing the male mold and then removing the molded structure, molding is carried out on a moving production line without danger of disturbing the resin while gelling by disposing the molds on bogies and moving the bogies onto motor driven glide rollers at the point where the resin is injected, and the bogies transported on the glide roller drive until initial gelling has taken place.

6 Claims, 12 Drawing Figures

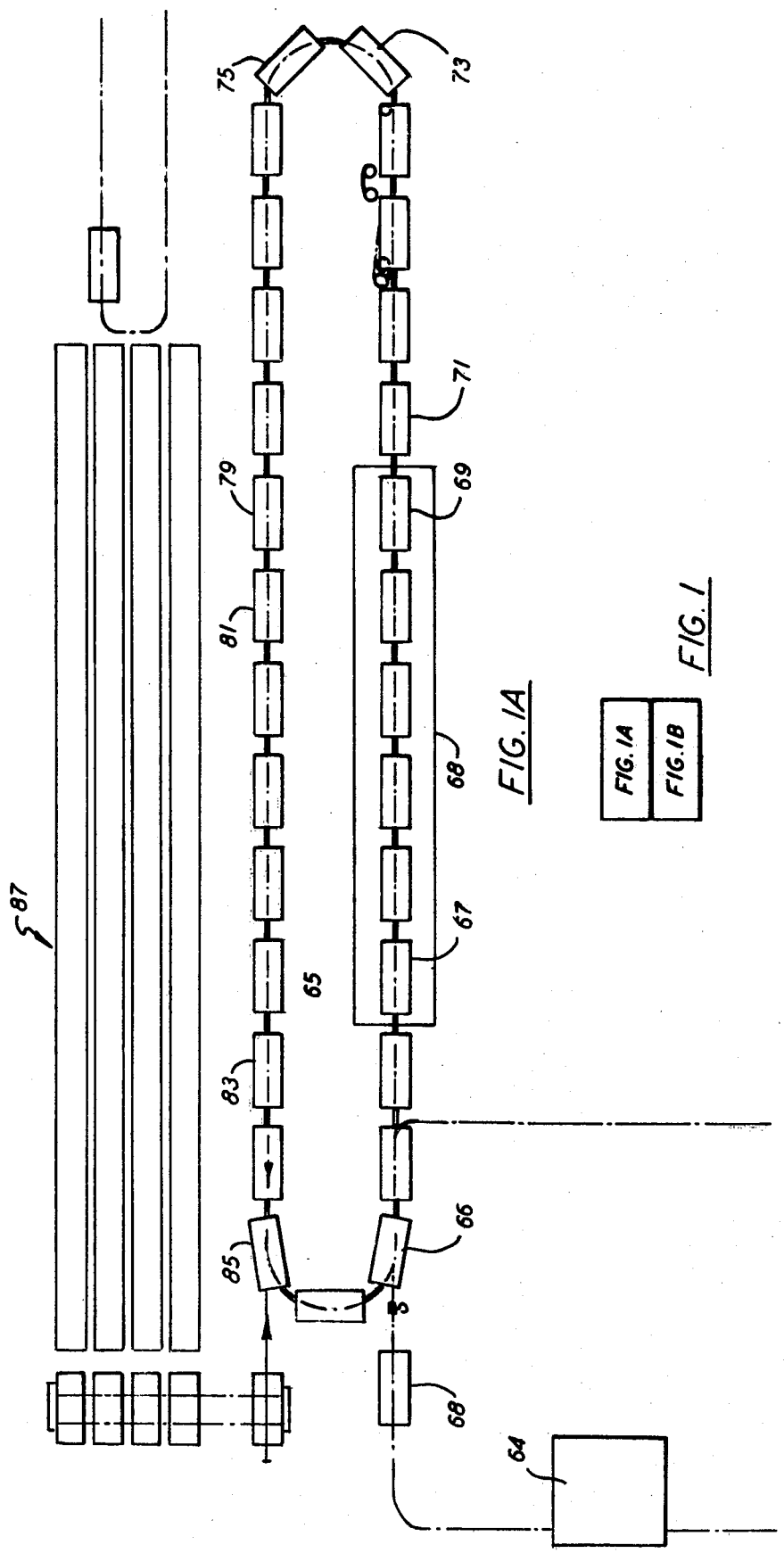

MOLDING PROCESS

This invention relates to the molding of glass reinforced plastic bodies in general, and more particularly to a method and apparatus for carrying out such molding continuously on an assembly line.

The use of glass reinforced plastic (GRP) for making molded bodies such as for making boat hulls, automobile bodies, snowmobile bodies and the like is well known. The process typically includes the laying up of layers of fiberglass mat and/or cloth along with the application of a plastic resin in the liquid state. The plastic resin then hardens with the fiberglass embedded therein and giving strength to the final molded body.

Typically, the process has been carried out utilizing molds which remain stationary during the time when the plastic resin is gelling. Movement during the gelling time can have deleterious effects on the final product. For this reason, in the past, boats, automobile bodies and the like, which have been made of GRP, have been made on a one-by-one basis, and true mass production of, for example, an automobile body has not been possible.

A known process for making automobile bodies is that described in British Pat. No. 1,432,333. In the process described therein, after laying up fiberglass in a female mold, a male mold is placed thereover, and vacuum utilized both to pull the mold halves together and to insure complete filling of the mold cavity by the hardenable liquid, i.e., the plastic resin. The use of this process places further constraints on assembly line operation in that the vacuum must be applied and maintained over a relatively long period of time, i.e., from just prior to the filling of the mold until after gelling has taken place. Heretofore, although this process has been used to make automobile bodies and other molded bodies, such has never been carried on an assembly line.

SUMMARY OF THE INVENTION

It is thus, the object of the present invention to provide a method and apparatus which permits mass producing molded GRP bodies on a moving assembly line.

It is also an object of the present invention to provide such a method which utilizes the vacuum process of British Pat. No. 1,432,333, commonly known as the VARI or Vacuum Assisted Resin Injection process. A further object is to provide a method of manufacturing an automobile body.

In order to accomplish these objects, the mold for the body is supported on a wheeled bogie. The bogie is continuously propelled around an oval shaped path. While moving on this assembly line, fiberglass lay-up takes place in the female mold, the male mold is placed thereover, the vacuum is applied and maintained, resin is injected and the vacuum maintained until getting takes place. After additional setting of the resin the male mold is removed, followed by removal of the finished molded body from the female mold for further curing and processing on another assembly line.

In order to insure that the mold is not jarred during the gelling period, from a time just prior to resin injection until a point where the resin will have gelled, the bogie does not run on its wheels but is supported on driven rollers instead. These rollers which are relatively closely spaced, smoothly drive the bogie at a controlled rate of speed without jerking or shaking so that gelling can take place while the bogie continues to move on the assembly line. Once gelling has taken place, the bogie again runs on its wheels pulled by a rotating chain.

In addition, the present invention provides a system which permits maintaining the vacuum in a plurality of bogies over a relatively long distance. This is accomplished by supplying compressed air in series to a plurality of adjacent bogies. Air is conducted from one bogie to the next via flexible hoses. Each bogie includes its own vacuum unit; in this way, the same level of vacuum is maintained in each of the connected bogies irrespective of distance from the compressed air source. At least two compressed air supply hoses are provided and check valves inserted between adjacent bogies so that, as each successive bogie comes along, a compressed air hose is attached to it, and the compressed air hose taken off the preceding bogie. In addition, since, to provide the desired tolerances, molds must be made such that there is a matching male and female mold, to aid in the process, molds are made in such a manner that there are two identical female and two identical male molds. Thus either male mold can be used with either female mold of the pair. To ease the assembly, when a male mold is removed after a body section has been molded, it is transferred across from one side of the assembly line, which is a closed loop, to another side and placed in a female mold which has just been laid up with fiberglass. In this way, the same mold is used with two different female molds. Each mold has a given life of approximately two thousand uses. The male mold, since it is used twice as often, will wear out twice as fast as the female mold, and thus, must be replaced with its twin which was made at the same time after a given number of cycles. After the same number of cycles again, new female molds will then also be installed.

The molding process of the present invention will be described in terms of molding an automobile body. However, it should be recognized, that what is taught is equally applicable to the molding of other types of GRP bodies, such as for, boats, snowmobiles, other vehicles and for that matter other types of structural bodies. Furthermore, there is also described a novel method of making an automobile body which comprises an inner molded body and an outer stainless steel body attached thereto.

BRIEF DESCRIPTION OF THE DRAWINGS

FIGS. 1A and 1B, together, are a plan schematic view of the various assembly lines utilized in making an automobile body utilizing the processes of the present invention.

DETAILED DESCRIPTION

Figure 1B:
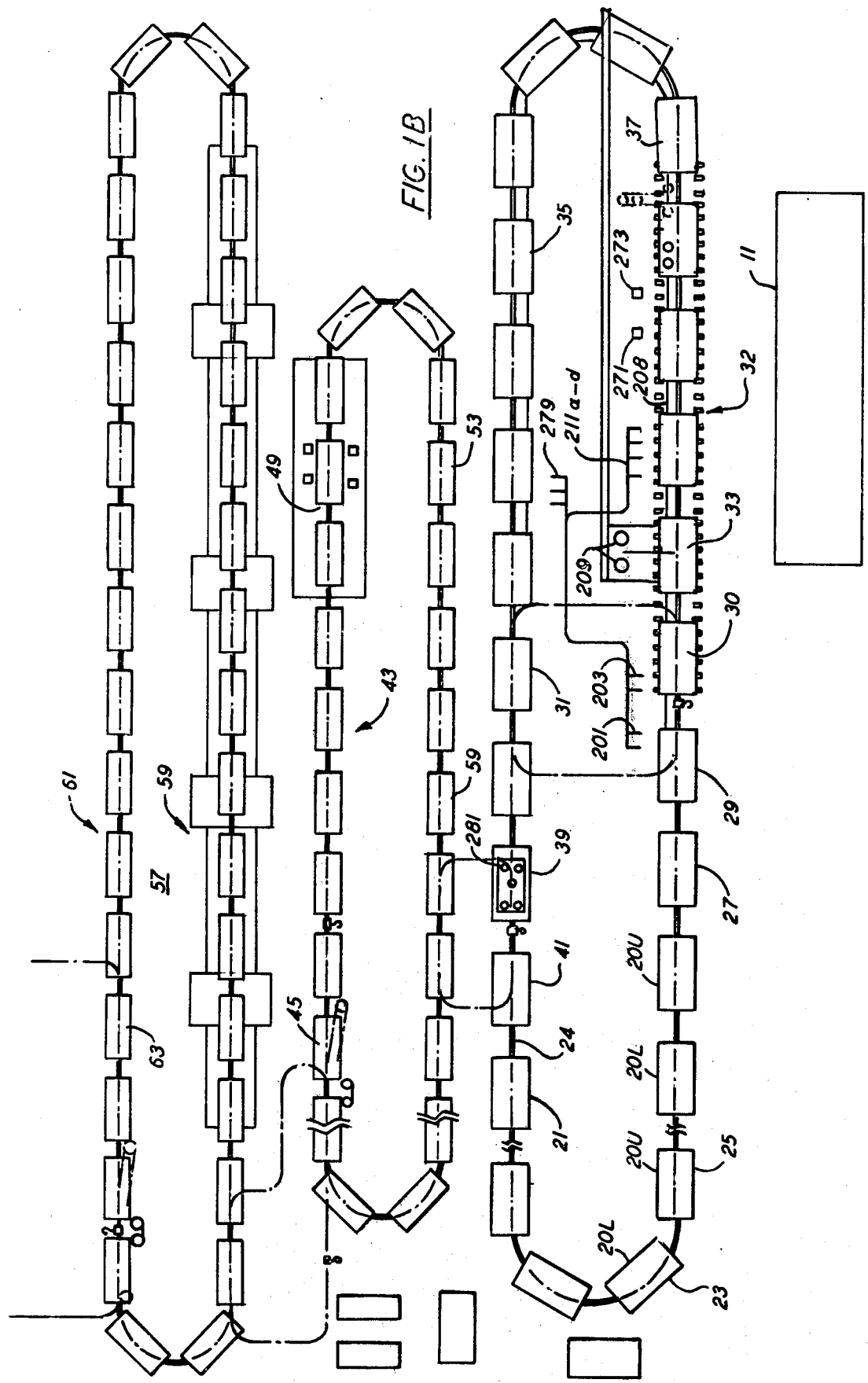

Before going into a detailed description of some of the novel aspects of the process of the present invention and the automobile produced thereby, an overview of the process will be given. Some of the steps in manufacturing the automobile are conventional. For the most part, the differences which exist reside in the manner of making the body and in the body which results from this process. Unlike conventional car bodies, which are normally made of steel, the body of the present invention is made of glass reinforced plastic (GRP). The GRP body is then clad with stainless steel panels for durability, safety and appearance reasons, as will be described more fully below. The GRP body is manufactured in a separate area, possible a separate building, and the finished GRP body is then brought to a main assembly area. In the main assembly area, two basic assembly lines are established, a trim line and a chassis line. The body proceeds along the trim line and, in a conventional fashion, has the necessary elements of trim added thereto. At the same time, chassis are proceeding along the chassis line. In conventional fashion, the suspension, brakes, engine, clutch, fuel and brake lines, are installed, as are necessary wiring harnesses and so on. At the end of the respective trim and chassis lines, the body is mated to the chassis and affixed thereto. A bank of automobiles so formed is then accumulated. The automobile, almost finished, then proceeds through a number of other stages where the stainless steel body panels and doors are installed and final touches carried out. For a large part, at this time, the automobile is conveyed by a Tellus Carrier, a robot-like device. Finally, after the seats are installed and the wheels and tires put on the automobile, the tank is filled with fuel and final alignment and testing done, after which the car is given a short road test on a test track.

It will be recognized that, for the most part, what has just been described more or less follows the conventional practice in the manufacture of automobiles. One of the key differences described here is in the body and the manner in which the body is manufactured. GRP construction has been used to a limited degree in automobile bodies. It has been used extensively in boat construction. In the past, the formation of GRP parts, such as boat hulls or automobile bodies, had been a very time-consuming task with the application of the fiberglass reinforcement and the resin being done essentially by hand. An improved process for molding GRP parts is disclosed in British Pat. No. 1,432,333. This process, which has come to be known as the VARI process, standing for Vacuum Assisted Resin Injection, is one in which male and female molds are first prepared. The necessary fiberglass cloth or mat is laid up in the female mold and the male mold placed thereover in a sealing manner. At this point, resin is injected while, at the same time a vacuum is applied to the space between the two molds. This causes the molds to be tightly drawn together with the vacuum, simultaneously assisting the injection of the resin. As a result, good filling of the mold takes place as the two parts of the mold are squeezed together and correspondingly squeeze resin into empty parts of the cavity. A conventional type of resin is used which resin has a specific setting time. In the process disclosed in the above patent, stationary molds are provided which are held still during the resin's gelling period. Accordingly, the above referenced method has been useful heretofore only in making automobiles on a limited production basis. As must be evident such a method is not readily adaptable to a large scale moving assembly level or mass production system.

In accordance with the process of the present invention, mass production on a conveyor belt or the like is made possible. In order to accomplish this objective, the present invention must solve two problems: (1) eliminate or modify any motion which will have an adverse effect on the mold's content during the gel time of the resin, while still permitting the molds to be conveyed along an assembly line, and (2) insure the maintenance of a proper vacuum condition during gel time thereby keeping the mold halves tightly together and promoting resin flow to necessary locations all as described above.

With reference to FIG. 1A and 1B, which combined are a plan schematic view of a body-press building showing the various assembly lines, an area 11 is provided where molds are made. The molds, made of epoxy, will last for the manufacture of approximately 2,000 to 3,000 bodies. Mold preparation is carried out in conventional fashion with master molds being sprayed with a gel coat of epoxy to form the production molds used in molding GRP bodies. The mold area is provided with areas in which the production molds are made from the master molds. The auto body of the present invention is made up of a lower part and an upper part. Thus, it is necessary to have an upper male mold, upper female mold, lower male mold, lower female mold. A plurality of molds are manufactured and an inventory of replacement molds is maintained to substitute for production molds which wear out by use on the assembly line. In another area of the building, fiberglass material is cut and foam beams (Polystyrene or the like) for reinforcement or structural strength, in the auto body, produced. When used in GRP construction a foam beam essentially forms a void around which a box structure of GRP is formed. Such beams wrapped with fiberglass are placed in the GRP body molds at locations where additional strengthening of the auto body is desirable or necessary. In the illustrated embodiment, 28 production molds (14 upper body/14 lower body, each body having male and female portions) are provided, alternately upper and lower body molds. The molds are carried on wheeled bogies to be described in detail below. Thus, there are shown alternating molds 20U and 20L, representing, respectively, the molds for the upper and lower body sections. The beginning of the production line for body parts can be considered as being at location 21. From location 21 to a location 23, the molds are treated with a release preparation in conventional fashion, i.e., the inside of the molds is coated with a release agent. At this point, only female molds are resting on the bogies on the assembly line and the molds and bogies are conveyed by a typical chain mechanism 24A. Beginning with location 25, the fiberglass lay-up takes place. From location 25 to location 27, fiberglass sheeting which has previously been cut, along with the foam beam reinforcements, are placed in the female molds. At location 29, the male mold is placed over and mated with the female mold. The male mold that is placed on the female mold has been removed from another female mold at location 31. Thus, although there are 28 female molds in use, there are only 14 male molds in use at any one time. Because of this extra use of male molds, it is necessary to replace male molds twice as often as female molds. For this reason, additional male molds are maintained in the area 11. The molds are made in couples, that is to say, the molds at locations 29, and 31 constitute a pair of molds. This is so that the two female molds at these locations will mate with one corresponding male mold which is used with both. A second male mold is made at the same time and stored in reserve. Thus, two identical male molds are associated with this matched pair of female molds at locations 29 and 31 and can be interchanged when necessary. Once the molds are mated at location 29, vacuum is applied, at location 30, in a manner to be described in more detail below, followed by resin injection at location 33. Resin is injected sequentially through three holes in the male mold. Each hole contains a plug which is removed for resin injection. After each injection, the corresponding hole is plugged.

From the point at which mating took place until the resin has gelled, the molds and bogies are no longer carried by the conveyor belt but, rather, they now ride on a glide roller drive generally indicated as 32. Glide roller drive 32 comprises a plurality of driver rollers on which the molds rest and by means of which they are propelled. The rollers are all driven at a controlled constant speed synchronised with the speed of the chain drive so as to gently move the molds and bogies along, the bogies at all times being supported at a number of points so that no jarring takes place. Consequently, rather than simply pulling the molds along, they are moved along by a positively driven glide ride roller drive, it now becomes possible to continue to move the molds while the resin is gelling without disturbing the resin. After the resin is injected at location 33, the vacuum is maintained until location 35 is reached. It has been found that using a separate vacuum unit, operated by compressed gas, at each mold and then interconnecting in series the molds to one another from locations 31 through 37 avoids overhead lines. At location 37, the bogies come off the roller drive 32 and are again conveyed by the conventional conveyor chain 24. Between location 35 where vacuum is removed and location 31, additional setting of the resin takes place. By the time location 31 is reached, it is safe to remove the male mold and transfer the male mold to its new mate at location 29.

At locations 39 and 41, a lower body and upper body part are picked up and transferred to a jig truck on a further line 43. On this line, between locations 59 and 53 further curing takes place. Thereafter, rough fettling and trimming of flashing takes place between locations 53 and 49. In other words, rough cut openings are made in the body at the points where they ultimately will be needed, e.g., at the window and door locations. These openings also aid in the process of curing the resin by permitting air flow across and through the body. After rough fettling, between locations 49 and 50 the flanges are cleaned and primed. The primer is allowed to dry and the upper and lower body parts are then mated to each other and bonded while being clamped, using clamps which locate and clamp the parts together. At the same time, the upper and lower body parts are stapled together to insure further that the two body parts remain intact as a unit. This occurs between locations 45 and 47. Adhesive is applied to the lower body part flange. The bodies, which are now a single piece enclosed structure, are then transferred to another line 57 where they pass first through a curing oven 59 with the roof supported by a jig to prevent sagging during curing, and then through another cooling bank 61. After the cooling at location 63, a transfer to an area 64 for application of a master drilling fixture to the body takes place. This master drilling fixture or jig is of critical importance in that it fixes where the doors of the car will be installed. It drills six holes in the roof, two holes in each side sill and ten chassis mounting holes. In essence, the jig locates key holes from which all other drilling operations are carried out. Additional drilling operations to form holes in the body through which attaching hardware goes, and through which other gear is affixed to the body takes place at location 68.

The body is then transferred to a further line 65. On line 65, beginning at location 66, further fettling takes place and continues up to location 69. At location 66 openings for the doors, windows, etc., are cut out in a novel manner utilizing a high pressure water jet. This cutting is done automatically with a template-like fixture attached to the body and located via key holes drilled with the aid of the master drilling fixture and the high pressure water jet then guided around a track so as to cut out the desired opening. Carrying this out automatically avoids the danger of personnel coming into contact with the high pressure jet. Although the jet at close range is capable of making a clean cut as required, the jet's energy dissipates so that damage to another area of the body does not take place. Further fettling using conventional cutting tools takes place in a ventilated enclosure 68 between locations 67 and 69. At locations 71 and 73 SMC in-fill panels are installed as more fully described in copending application Ser. No. 242,467, filed Mar. 11, 1981. Further drilling is accomplished between locations 75 and 79. From location 81 to location 83, inspection and checking of the body, which has now been drilled and fettled, takes place. At location 85, the body is transferred to a buffer bank 87 so that a plurality of bodies are ready to be transferred to the assembly building, where the bodies go on to the trim line and are thereafter mated with a chassis.

Figure 2:
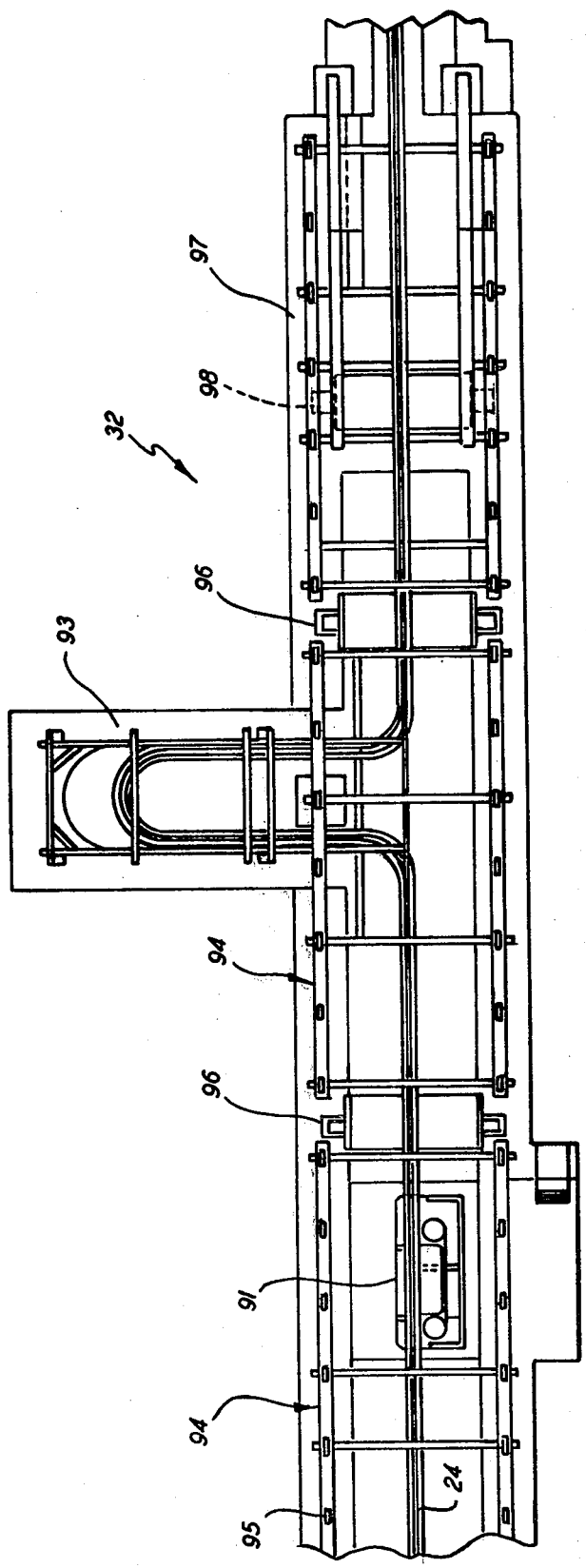
FIG. 2 is a plan view of a section of one of the assembly lines shown in FIG. 1B in which the bogie containing the mold is transported by means of driven rollers.

FIG. 2 is a plan view of a portion of the glide roller drive 32. Visible is the drive chain 24 which, as will be seen more clearly below, is below the rollers and not at this time being used for driving the bogies. Because the chain is not in use at this time, a drive unit 91 for the chain can be provided below the glide roller drive 32. Similarly, a chain tightening apparatus 93 is provided which permits maintaining proper chain tension. Within the glide roller drive a plurality of sections or tables are provided. These include glide roller tables 94 which include a plurality of glide rollers 95 driven in a manner to be described more fully below. Also included are drive tables 96 on which are mounted the motors for driving the rollers 95. At each end of the glide roller drive is a ramp section 97 along with an associated drive 98 for driving the rollers thereof.

Figure 3:
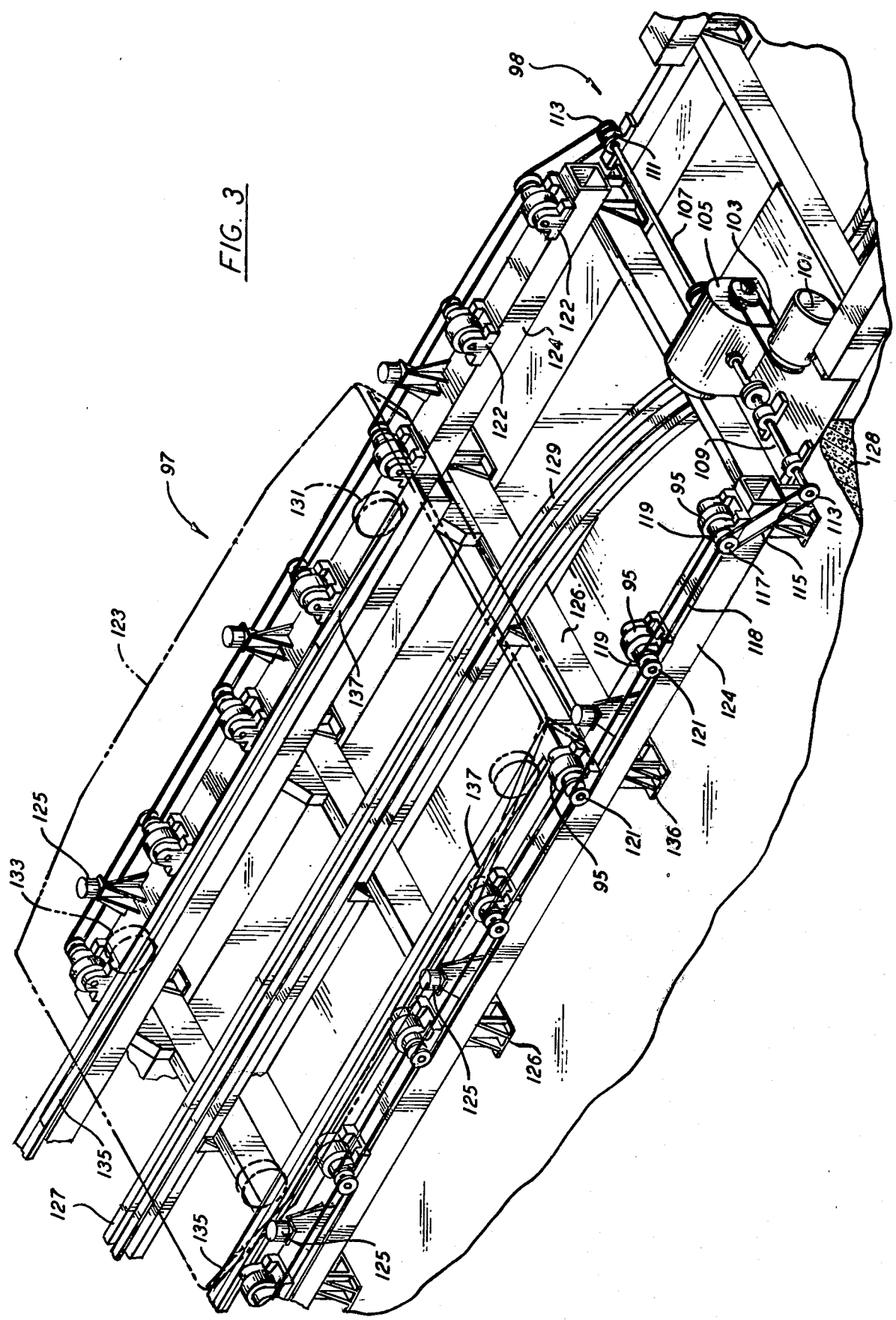
FIG. 3 is a perspective view of one of the roller drive sections of the present invention at the location of the entry into this section.

The nature of the glide roller drive is illustrated by FIG. 3 which is a perspective view of an entry ramp section 97 along with its associated drive section 98. The entry and exit sections 97 are identical to the normal drive tables 94 except that they also include ramping. Thus, the following description of the rollers and so on applies equally to the drive tables 94. Similarly, the tables 98 are essentially identical to the tables 95.

Each glide roller table 94 or 97 is associated with a drive table 96 or 98 for driving its rollers. As illustrated by FIG. 3, the drive table includes a motor 101 coupled by a belt 103 to a gear box 105 containing a differential 109 properly supported for rotation in bushing assemblies 111. Each of the shafts 107 and 109 terminates in a pulley 113. Pullies 113 are coupled over chains 115 to another pulley 117 on the shaft of the first roller 95. Another pulley 119 on the same shaft couples this roller to a pulley 119 on the next roller 95. It in turn contains a pulley 121 with a chain coupling this pulley to another pulley 121 on the next succeeding roller 95. The succession of chains 118 and 120 and pulleys 119 and 121 continues from roller 95 to roller 95 on both sides of the glide roller drive. The rollers and pulleys are supported in bushing blocks 122. These in turn are supported on longitudinally extending beams 124. Beams 124 rest on cross beams 126 supported on a concrete base 128 using support brackets 136 for levelling. The bogie 123 is shown in phantom view resting on the rollers 95. The bogie is guided laterally by means of rollers 125 supported for rotation about a vertical axis and disposed on both sides of the drive system.

The illustrated table section is at the entrance to the glide roller drive section. Up until this time the bogie was being driven by the chain 25 which is retained within a channel 127. In this section, the channel 127 includes a section 129 causing the chain drive to disengage and the roller drive to take over. The bogie has front wheels 131 also shown in phantom and rear wheels 133. The rear wheels are spaced closer together than the front wheels. When entering the section where to the roller drive starts, the wheels must disengage from contact with the track. This is accomplished by means of rear ramps 135 for the rear wheels and front ramps 137 for the front wheels. As the wheels go downward on the ramps 135 and 137, machined glide rails 138 on the bogie are brought into contact with the rollers 95 until the wheels reach a point where they are no longer in contact with the track. From that point on the bogie is driven completely by the rollers with the chain also having been disengaged and the chain running far beneath the drive tables.

Figure 4:
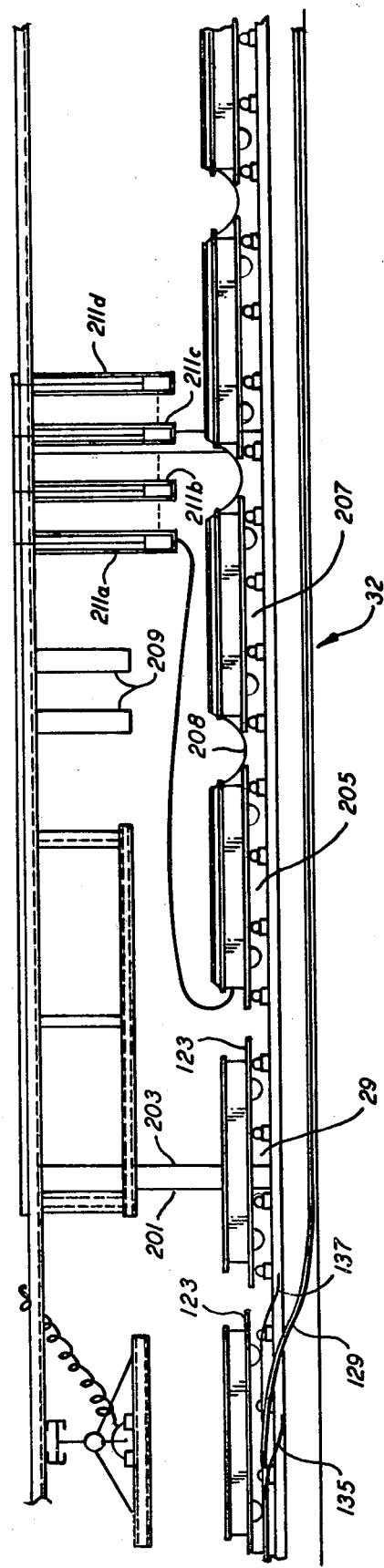
FIG. 4 is an elevation view of the roller section also illustrating the location of mold transfer, vacuum and resin injection equipment.
Figure 5:
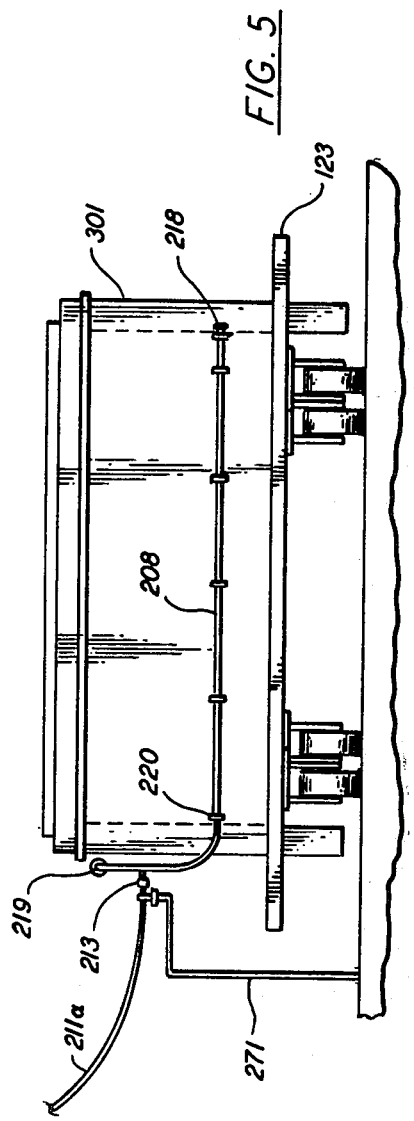
FIG. 5 is an end view of the mold resting on the bogie.

FIG. 4 is an elevation view of the glide roller section 32 of the assembly line 22. This view schematically illustrates the rear ramps 135 and front ramps 137. In addition, the curved section of the channel 129 for the chain is also illustrated. Once the male mold is dropped into place at location 29, (see FIG. 1B) a quick evacuation of air is carried out utilizing the vacuum units 210 and 203 at locations 29 and 205. At location 207, resin from resin blending tanks 209 (to ensure homogeneity of resin) is fed to three intake points in each mold. Beginning with location 205, a number of separate molds are pressure linked to each other by means of interconnecting air hoses 208. These connections are maintained at least until location 35. After the short evacuation with the vacuum units 201 and 203 between locations 29 and 205, one of the hoses 211, a, b, c, or d is connected to a mold at location 205. Referring to FIG. 5, for example the hose 211a is shown as connected to an appropriate fitting 213 on the mold. The fitting 213 is on a pipe 215 which mates with an air header or manifold 219. A second fitting 217 which permits connection to a succeeding unit via a flexible hose 208 also is connected to line 215. This is shown in more detail at FIGS. 6 and 7.

Each mold has its own evacuation unit 220. Typically as shown in more detail on FIG. 7, PIAB M125 vacuum units 223 available from PIAB of Brentford, England, are installed on each of the molds. Compressed air is fed to the air header 219 either from fitting 213 or from a fitting 217. Each fitting has an associated stop valve 218. Compressed air is conducted through a further stop valve 221 to the PIAB unit 223. PIAB unit 223 includes a regulator 225 and a vacuum switch 227 receiving feedback from a vacuum sensing line 229. Vacuum is created in a line 231 which couples to vacuum manifold 233 through changeover valve 237. Coupled to the vacuum manifold 233 through a nonreturn valve 239 is a fitting 241 to permit connection to the high vacuum unit hose 201 or 203 for the fast evacuation when the male mold is first placed on the female mold. The changeover switch is coupled through a stop valve 243 to another fitting 245 permitting connection of a compressed airline for lifting of the male mold part as explained below.

Figure 6:
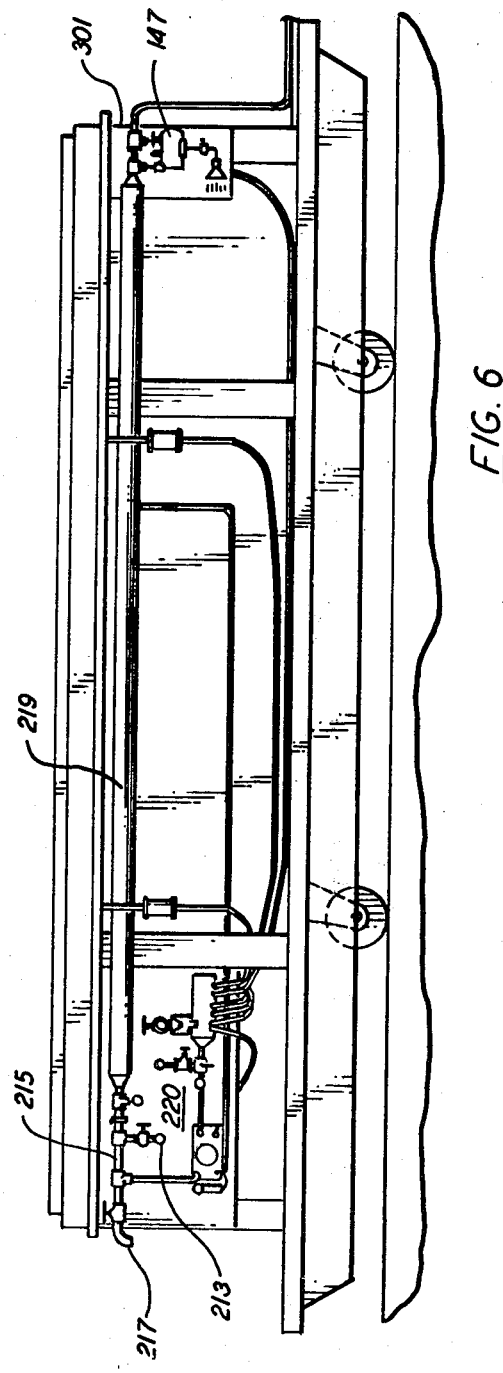
FIG. 6 is a side elevation view of the bogie and mold thereon.
Figure 7:
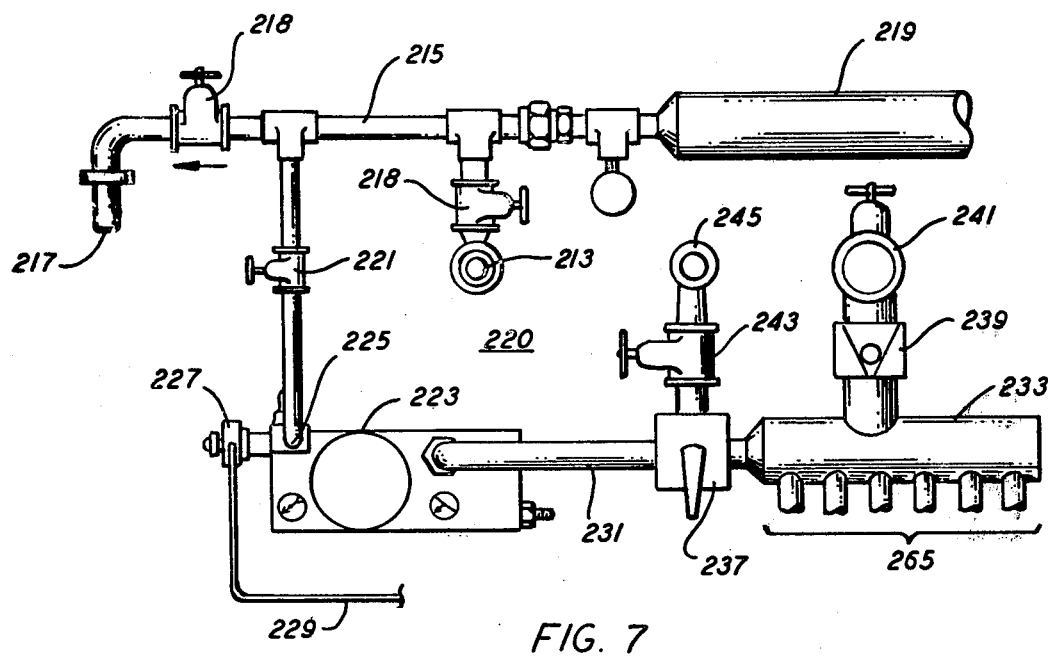
FIG. 7 is a schematic view of the vacuum system of the present invention.
Figure 8:
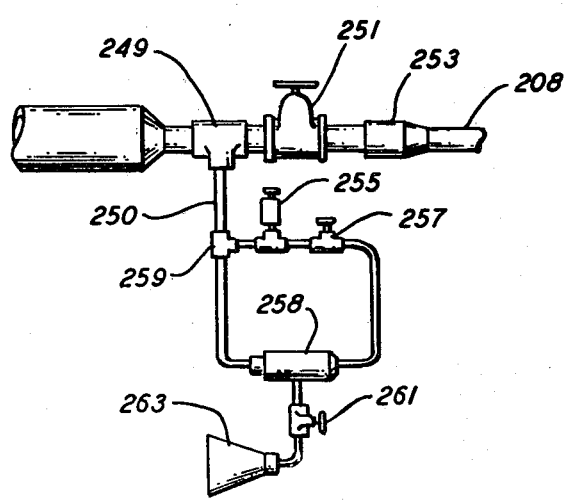
FIG. 8 is a view of a pressure drop warning system provided on each mold.

As illustrated by FIG. 6, at the other end of the air header 219 is a pressure drop warning system 247. This is shown in more detail in FIG. 8. The air header couples through a "T" 249 and a valve 251 to a fitting 253 which accepts an interconnecting hose 208 which couples to the fitting 217 on the next mold down the line. The hoses 211a—d and hoses 208 have a check socket at their ends, e.g., end 218 of hose 208, shown retained by clips 220 in FIG. 5. Fittings 213 and 217 comprise check plugs. Coming off the "T" 249 in FIG. 8 is a line 250 to a further "T" 259. The straight through connection of "T" 259 is to a pressure drop sensor 258. The branch of "T" 259 couples through a vent reset 255 to a pressure regulator 257, which regulates pressure 75 PSI. This then feeds the other side of pressure drop sensor 258. Thus, pressure drop sensor 157 has one side coupled to the header pressure and the other side coupled to the regulator 257. If the header pressure drops below the regulated pressure an output occurs. The output of the pressure drop sensor is coupled through a one bar regulator 261 to an audible signal generator 263.

Thus, if the air hose 211a is coupled to the mold at location 205, compressed air is supplied to each of the interconnecting molds by means of the interconnecting lines 208. In other words, air is supplied to the header 219 in the first location from the hose 211a through fitting 213 shown in FIG. 5. It travels through header 219 and from the fitting 253, via hose 208, to the fitting 217 on the next mold, and so on down the line. This arrangement enables the molds to continue moving without the need of complicated overhead and overlapping pressure hoses. At each of the PIAB vacuum units 223 the compressed air creates a vacuum which will be present in the respective vacuum manifolds 233. Since each vacuum unit 223 is self-regulated, the same vacuum is maintained in each.

Figure 9:
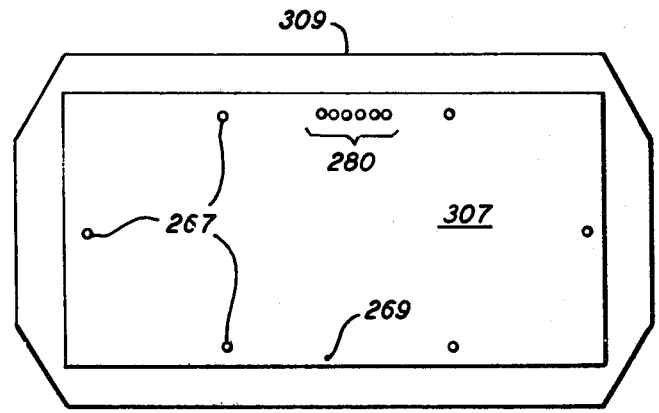
FIG. 9 is a plan view illustrating the location of evacuation points in the mold.

As indicated, the vacuum manifolds have six outlets 265. These outlets are coupled to the evacuation points 267 illustrated in FIG. 9. Also illustrated in FIG. 9 is the vacuum sensing point 269 which is coupled to the vacuum sensing line 229 shown in FIG. 7. Alternatively vacuum sensing line 229 may be coupled to header 233. As the molds are conveyed along, the molds shown in FIG. 4 at location 205, will move to location 207. The female mold at location 29 will be supplied with a male mold and will move to location 205. A new hose connection 208 will be made between the two molds and then another one of the air hoses, e.g., hose 211b attached to the new mold now in position 205. It then becomes possible to remove the hose 211a and bring it back to a new "first" mold in succession. In this way, there is no interruption of air supply. Should the operator forget to remove the air hose, in order to prevent damage to the hose reels and fittings, there is an audible warning switch 271 shown both in FIG. 1b and FIG. 5. *If the hose is still connected at this point, a switch is hit sounding an audible warning to tell the operator to remove hose 211a.* If the hose is still not removed by the time a safety switch 273 is reached, the assembly line is shut down to prevent possible damage. When the molds reach location 35, the remaining interconnecting hose 208 is or has been removed.

For separation of male mold from female mold, the plugs in the resin injection holes are removed and compressed air is applied by air hose and reel 279 through the resin injection holes thereby breaking the seal between male mold and the female mold. Also, changeover switch 237 is thrown and compressed air is supplied through the fitting 245 to the manifold 233. The compressed air supplied through the vacuum manifold to the evacuation points results in further mold separation, sufficiently releasing the male mold to allow its transfer from position 277 back to position 299. Connection is made to the compressed air supply through one of two compressed air hose and reel units 279. A connection is then made to the blow-off header to release the molded part from the female mold part. Compressed air is supplied to each of the openings 280 of FIG. 9 and flows through tubing to blow-off points in the female mold to release the molded part from the female mold. The molded part is then lifted out of the mold by means of a vacuum operated body shell lifting jig 281. The finished body part is then transferred to the next line in the manner described above.

Figure 10:
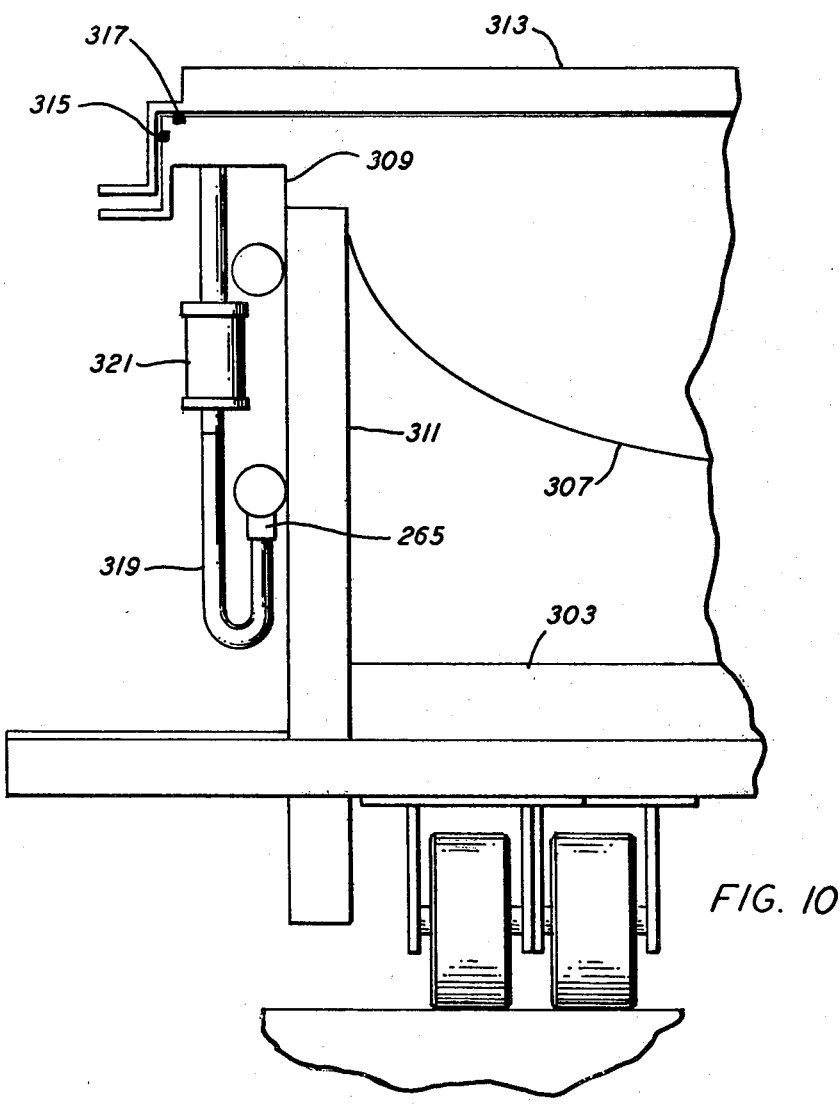
FIG. 10 is a view illustrating the manner in which the male and female molds are sealed to each other.

FIGS. 5 and 6, in particular, illustrate another aspect of the system of the present invention. All of the air and vacuum distribution system is mounted on what is referred to as a cradle indicated generally as 301. As shown in FIG. 10, cradle includes a base 303 supported on the bogie 123. As is evident from FIG. 5 and 6 and also from FIG. 10, the cradle 301 in essence is a box into which a female mold 307 is inserted. Referring again to FIG. 9, note that the female mold is shown as having a flange 309. The flange 309 corresponds in general to the portion 309 of the mold of FIG. 10 which rests on a side member 311 of the cradle. Also shown in FIG. 10, is the male mold 313. Note that the male mold is provided with a side seal 315 and a top seal 317. Thus, the mold is designed so that, as it begins to move down into contact with the female mold, initial sealing takes place because of the side seal 315. Final sealing takes place by means of top seal 317. Also shown in FIG. 10, is one of the lines 319, coupled to the outlet 265 of the vacuum manifold 233. Note, as shown on this FIG. and also FIG. 6 (with FIG. 9 illustrating in general the locations to which these lines are directed) there is a fiberglass trap 321 in each of the lines to prevent fiberglass from being drawn into the manifold and thence into the vacuum unit.

Figure 11:
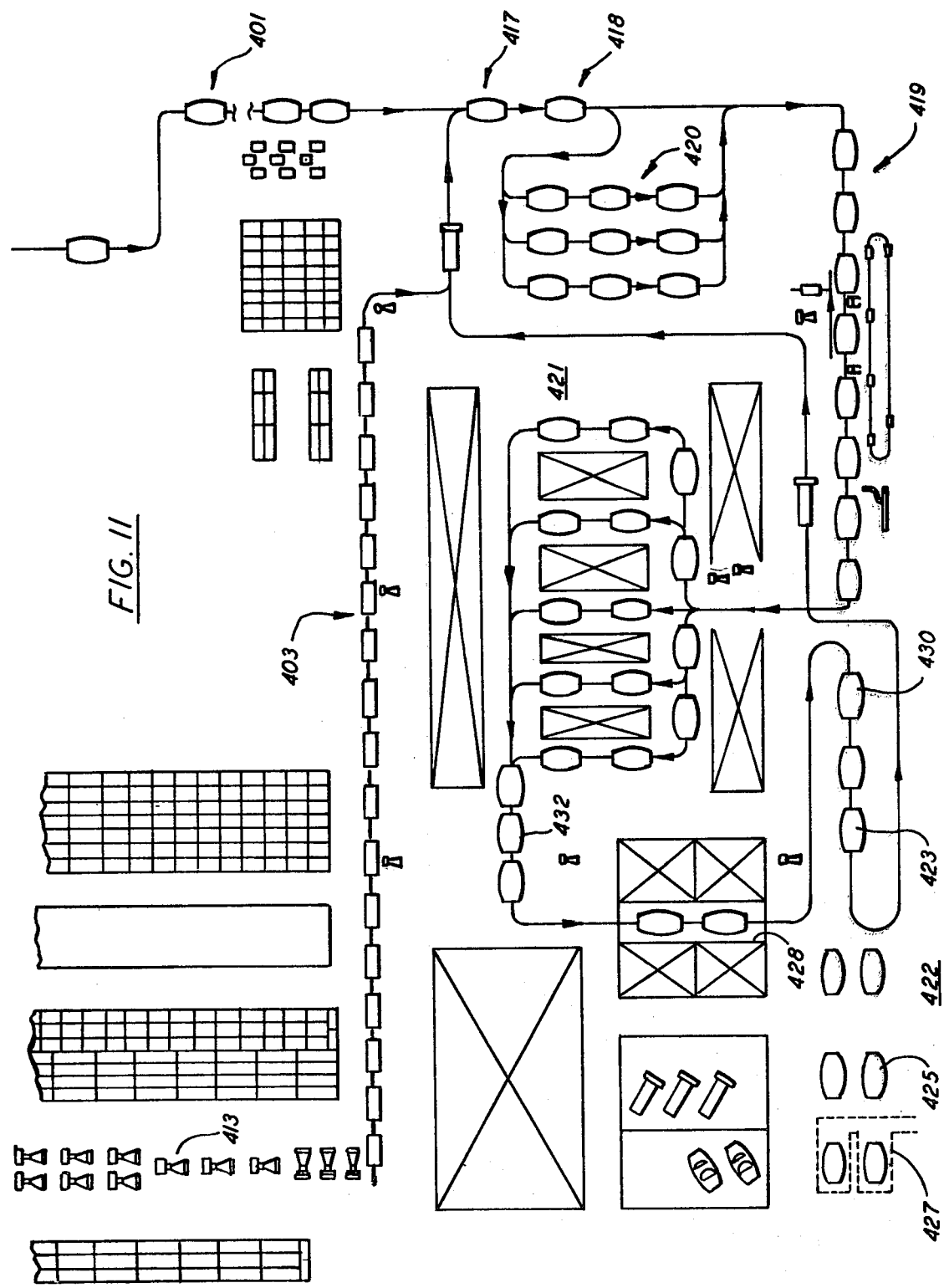
FIG. 11 is a plan schematic view illustrating the manufacturing of an automobile in which the body made on the assembly lines of FIGS. 1A and 1B receives its trim while a chassis is being fitted whereafter the chassis and body are mated and final operations for finishing the car carried out.

Referring now to FIG. 11 there is a view of the trim line 401 and the chassis line 403 in the final stages of assembly. As indicated previously, the bodies when finished in the manner described above are transferred to the assembly building where they proceed down a trim line 401. Since the operation along the trim line is conventional, it will not be described in detail. At the same time, chassis are supplied to a storage point 413, from which they are transferred to the chassis line 403, where the various chassis assembly operations take place. Finally, the chassis is mated with the body at a location 417. The chassis is fixed to the body at location 418, using holes previously located and drilled, as discussed above, for that purpose. The finished body and chassis then proceed to a line 419, either directly or via storage bank 420, where further operations take place. The body and chassis combinations now enter an area 421 where they are each conveyed on a Tellus Carrier, ie, a robot-like platform, which is capable of moving them from location to location without restriction. It is in this area that the stainless steel panels, including the front fenders, front bonnet, front bumper and sill roof panel, quarter panel, rear bumper and engine compartment cover are put in place. Also in the area 432, gull wing doors are assembled onto the car and the critical alignment of all parts takes place. As noted above since all the location holes were drilled and located using an accurate jig, the door will be accurately located and it is possible to match all of the other parts to the door.

At the time that the jig is applied to the body and the holes drilled, SMC panels are applied to the body and are located by and in relation to the jig. The panels thus accurately locate the fenders, for example, with respect to the doors. Thus, when the sheet metal is mounted to the sheet molding compound (SMC) panels, which essentially extend from the GRP body into the gap between door and door cutout a good match between the fender panels and the doors will take place. Fastening of the stainless steel to the SMC panel is done with appropriate fittings to permit minor adjustment. In addition, attachment of the sheet metal to other SMC panels and other parts of the GRP body is carried out. A significant aspect of this manner of attaching the stainless panels to the GRP body is that, under stress the SMC panels carrying out the the attachment will give way and absorb energy. As a result, an impact can be absorbed without destroying the GRP body. For example, it might only be necessary in an accident to replace a fender unit or the like. The attachment of the stainless steel panels is described in detail in copending application Ser. No. 242,467, filed March 11, 1981.

Seat and wheel installation take place at location 428 and the gas tank is filled at location 430. The finished automobile 423 then proceeds through adjustment and test in areas 425 and 427 before being road tested on the test track.

What is claimed is:

1. In an assembly line in which wheeled bogies are transported by a continuous chain drive in an endless path, apparatus for conveying the said bodies over a portion of said path in a manner such as to avoid jars and vibrations comprising;
   a. a glide roller drive system comprising a plurality of spaced rollers adapted to support said bogies such that their wheels are off the ground;
   b. means of restraining said bogies laterally;
   c. ramp means for directing said bogie from its normal track onto said rollers in such a manner that said bogie simultaneously comes into contact with a plurality of said rollers over its length so as to be immediately supported; and
   d. means to direct said chain drive to a position below said bogie so as to disengage said chain drive from said bogie and move said chain in a position away from said bogie.

2. Apparatus according to claim 1 wherein said roller drive comprises;
   a. at least one glide roller table having thereon a plurality of pairs of rollers, said pairs spaced along the length of the table and the rollers in each pair laterally spaced from each other;
   b. a plurality of rollers disposed for rotation about a vertical axis for laterally guiding said bogy;
   c. a drive table including thereon:
      i. an electric motor; and
      ii. a gear box including a differential having drive shafts extending laterally therefrom in two directions; and
   d. drive means coupling said drive shafts to said rollers.

3. Apparatus according to claim 2 wherein a plurality of said drive tables are provided.

4. Apparatus according to claim 3 wherein said plurality includes an entrance table and an exit table, said entrance and exit tables being equipped with ramps extending below the level of the track on which the wheels of said bogies normally ride, whereby said bogies will ride downward into contact of said rollers.

5. Apparatus according to claim 4 wherein said bogies contain a pair of front wheels and a pair of rear wheels, one of said pair of wheels being more closely spaced than the other and wherein said ramps comprise front ramps and rear ramps, said front ramps having a lateral spacing equal to the spacing of the front wheels and the rear ramps having a lateral spacing equal to the lateral spacing of said rear wheels, the spacing of said ramps in the direction of travel being equal to the longitudial spacing between said front and rear wheels whereby all wheels will simultaneously ride on a ramp to thereby cause said bogie to come into contact with a plurality of rollers at the same time.

6. Apparatus according to claim 5 wherein said bogies are adapted to carry thereon molds to be used in a vacuum molding process and further including:
   a. means to supply a vacuum to a plurality of molds supported on bogies on said line; and
   b. means to inject resin into said molds disposed adjacent to said line.

* * * * *